US011312475B2

(12) United States Patent
Medina (10) Patent No.: US 11,312,475 B2
(45) Date of Patent: Apr. 26, 2022

(54) SPOILER DROOP FUNCTION WITH MECHANICAL FEEDBACK DRIVING HYDRAULIC VALVE

(71) Applicant: GOODRICH ACTUATION SYSTEMS SAS, Saint-Ouen l'Aumône (FR)

(72) Inventor: Raphael Medina, Ecouen (FR)

(73) Assignee: GOODRICH ACTUATION SYSTEMS SAS, Saint-Ouen l'Aumône (FR)

( * ) Notice: Subject to any disclaimer, the term of this patent is extended or adjusted under 35 U.S.C. 154(b) by 172 days.

(21) Appl. No.: 16/711,488

(22) Filed: Dec. 12, 2019

(65) Prior Publication Data

US 2020/0391846 A1 Dec. 17, 2020

(30) Foreign Application Priority Data

Jun. 14, 2019 (EP) .................................... 19290041

(51) Int. Cl.
*F15B 15/20* (2006.01)
*B64C 9/32* (2006.01)
(Continued)

(52) U.S. Cl.
CPC .............. *B64C 9/323* (2013.01); *B64C 13/30* (2013.01); *F15B 13/02* (2013.01); *F15B 15/204* (2013.01); *F15B 15/24* (2013.01); *F15B 15/14* (2013.01); *F15B 2211/30565* (2013.01); *F15B 2211/325* (2013.01); *F15B 2211/50509* (2013.01);
(Continued)

(58) Field of Classification Search
CPC .. F15B 15/24; F15B 20/004; F15B 2211/325; F15B 2211/524; F15B 2211/7053; B64C 9/323

See application file for complete search history.

(56) References Cited

U.S. PATENT DOCUMENTS 5,615,225 A 3/1997 Foster et al.
6,043,644 A 3/2000 De Coulon et al.
(Continued)

FOREIGN PATENT DOCUMENTS

| EP | 2524865 A1 | 11/2012 |
| WO | 03098052 A1 | 11/2003 |
| WO | 2006105048 A1 | 10/2006 |

OTHER PUBLICATIONS

European Search Report for Application No. 19290041.3, dated Dec. 16, 2019, 8 pages.

*Primary Examiner* — Thomas E Lazo
(74) *Attorney, Agent, or Firm* — Cantor Colburn LLP (57) ABSTRACT

A system for detecting and controlling the position of a spoiler of an aircraft wing is described herein comprising: a hydraulic actuator having a piston rod operably connected to the spoiler, the piston rod being moveable between a retracted position, a neutral position and an extended position; and means for providing power to said hydraulic actuator; and a mechanical device for detecting whether the piston rod is in the retracted position, the neutral position or the extended position; and means, operatively connected to the mechanical device, that is configured to provide a change in a load applied to said hydraulic actuator, wherein said means is configured to change said load based on whether said piston rod is detected as being in said retracted position or said extended position.

9 Claims, 5 Drawing Sheets

(51) Int. Cl.
*B64C 13/30* (2006.01)
*F15B 15/24* (2006.01)
*F15B 13/02* (2006.01)
*F15B 15/14* (2006.01)

(52) U.S. Cl.
CPC . *F15B 2211/5159* (2013.01); *F15B 2211/524* (2013.01); *F15B 2211/7053* (2013.01); *F15B 2211/76* (2013.01); *F15B 2211/8623* (2013.01); *F15B 2211/8633* (2013.01)

(56) References Cited

U.S. PATENT DOCUMENTS

| | | | | |
|---|---|---|---|---|
| 6,189,837 | B1 * | 2/2001 | Matthews | B64C 9/323 244/213 |
| 7,059,563 | B2 * | 6/2006 | Huynh | B64C 9/16 244/99.5 |
| 7,600,715 | B2 * | 10/2009 | Matsui | B64C 13/42 244/99.6 |
| 8,172,174 | B2 * | 5/2012 | Hejda | B64C 13/503 244/99.2 |
| 8,651,428 | B2 * | 2/2014 | Parker | B64C 9/16 244/203 |
| 9,038,964 | B2 * | 5/2015 | Wildman | B64C 9/14 244/215 |
| 9,994,304 | B2 * | 6/2018 | Ito | F15B 15/24 |
| 2002/0071298 | A1 | 6/2002 | Pennell | |
| 2004/0245386 | A1 | 12/2004 | Huynh | |
| 2010/0116929 | A1 | 5/2010 | Hejda | |
| 2013/0088243 | A1 | 4/2013 | Nyce et al. | |
| 2016/0214730 | A1 | 7/2016 | Nouhaud | |

\* cited by examiner

SPOILER DROOP FUNCTION WITH MECHANICAL FEEDBACK DRIVING HYDRAULIC VALVE

FOREIGN PRIORITY

This application claims priority to European Patent Application No. 19290041.3 filed Jun. 14, 2019, the entire contents of which is incorporated herein by reference.

BACKGROUND OF THE INVENTION

Wing flaps may be used on the wing of an aircraft to control the lift of the wing, and may similarly be used to control the velocity of the plane. When the aircraft is cruising, the wing flap lays flat along the wing. To reduce aircraft speed, or to increase lift, the flap is lowered relative to the wing. A spoiler may be actuated by a hydraulic actuator and is a moveable surface mounted on an aircraft wing behind the wing flap. In order to control speed and/or roll of the aircraft, the spoiler may also be lifted.

Most aircraft have a spoiler that operates using a positive stroke of an actuator rod—i.e. for extension of the rod to lift the spoiler. The stroke of the actuator is between a 'zero' position in the housing and an extended position and the control system is biased to return the rod to the zero position.

In this way, a spoiler is typically used only in extension, and a mechanical stop inside the housing stops the piston rod actuating the spoiler at the zero position.

More recently some aircraft have incorporated a 'droop' function in the spoiler, which utilises a negative stroke of the piston rod—i.e. further back into the housing than the zero position or, put another way, a stroke moving from the zero position in the opposite direction to the direction moved in the positive stroke for extending the rod.

The droop function is used to lower the spoiler relative to the wing e.g. for high lift manoeuvers. In addition, due to the relative movement between the flap and the wing, an air gap may open between the wing and the flap. The droop function may therefore also be used to actuate the spoiler in a negative close the large air gap between the wing flap and the spoiler if the wing flap is extended.

SUMMARY OF THE INVENTION

A system is described herein for detecting and controlling the position of a spoiler of an aircraft wing. The system comprises a hydraulic actuator having a piston rod that is operably connected to the spoiler. The piston rod is moveable between a retracted position, a neutral position and an extended position. The system further comprises means for providing power to said hydraulic actuator; and a mechanical device for detecting whether the piston rod is in the retracted position, the neutral position or the extended position. The system further comprises means, operatively connected to the mechanical device, that is configured to provide a change in a load applied to said hydraulic actuator, wherein said means is configured to change said load based on whether said piston rod is detected as being in said retracted position or said extended position.

The power supplied to the hydraulic actuator may be electrical or hydraulic.

In any of the examples described herein, the means configured to change said load based on the position of said piston rod may comprise a pressure relief valve.

In any of the examples described herein, the pressure relief valve may be operatively connected to the mechanical device and may be configured to switch from a first position to a second position upon detection that said piston rod is in the retracted position.

In any of the examples described herein, when said piston rod is in said retracted position and said pressure relief valve is in said second position, upon loss of said power, said pressure relief valve may reduce or limit said load applied to said piston rod.

In any of the examples described herein, the system may further comprise an anti-extension valve that is operably connected to said hydraulic actuator and configured to prevent the piston rod from moving into the extended position upon loss of said power.

In any of the examples described herein, the hydraulic actuator may comprise a retraction chamber and an extension chamber, and wherein if the hydraulic pressure in the retraction chamber is greater than the pressure in the extension chamber, the piston rod may move into the retracted position; and if the pressure in the extension chamber is greater than the pressure in the retraction chamber, the piston rod may move into the extended position. The anti-extension valve may be movable from a first position to a second position upon loss of said power, and wherein, in said second position said piston rod may be prevented from moving to said extended position unless a threshold pressure is reached in said retraction chamber.

In some examples, the threshold pressure may be 1.2 times a stall pressure of the system.

BRIEF DESCRIPTION OF THE DRAWINGS

Preferred examples will now be described by way of example only and with reference to the drawings.

DETAILED DESCRIPTION OF THE INVENTION

There are two main failure modes of spoiler control: 1) electrical failure, i.e. wherein electrical control to the spoiler is lost, and 2) hydraulic failure, i.e. wherein the servovalves are no longer able to be properly operated.

In the event of a failure in spoiler control, whether electrical failure or hydraulic failure, a problem can occur in the area of overlap of the spoiler and the wing flap ranges of motion, which may damage either the spoiler and/or the wing flap. The examples described herein therefore deal with this by providing a mechanical device that ensures that, in the event of failure when the spoiler is operating in the droop function, the spoiler is able to move backwards in order to permit free flap retraction.

For example, in electrical failure, electrical power driving the spoiler is lost and the spoiler will, under its own weight or under pressure from the associated electrohydraulic servovalve (EHSV) bias, press against the wing flap when not driven by the actuator, thus interfering with movement of the wing flap. The examples described herein therefore deal with this by limiting the load applied to the spoiler so as to avoid panel damage to both the spoiler and the flap.

In addition, during electrical failure, all position measurements of the spoiler may be lost, as the position is typically provided by electrical means such as a linear variable differential transformer (LVDT). With known systems, when such a position measurement is lost, it is impossible to determine whether the spoiler is in an extension position or a droop position. The examples described herein therefore deal with this by providing a way in which the spoiler position can still be detected, even when electrical failure has occurred.

Problems can also occur in spoiler control if there is a loss of hydraulic power. Here a solution to prevent extension of the actuator, is an anti-extension valve between the EHSV and the actuator that is switched to a pressure relief position when the hydraulic pressure falls below a predetermined pressure (usually 1.2 times a given 'stall' pressure). If the spoiler is extended, and pressure is lost, the spoiler will be retracted by aerodynamic load, and will gradually drop to become aligned with the wing surface until the zero hinge position is reached. It is important to keep the spoiler at this position and prevent a spurious extension.

During hydraulic failure, when the spoiler is in the non-overlapped region, the system should have an anti-extension set higher than the stall load e.g. 1.2 times the stall load Fstall. In practice, this means that the anti-extension mechanism kicks in when the pressure acting on the side opposite the spring is less than 1.2 times Fstall (or other set anti-extension force). However, in the overlapped region, this force can be too high and cause damage to the wing flap. It is therefore desirable that the flap can drive the spoiler with a reduced anti-extension threshold to avoid damage to the wing flap—i.e. the anti-extension mechanism is triggered at a lower force.

In view of the above, the new examples described herein provide a mechanical device that is able to measure the position of the spoiler and make a distinction between the extension position and a droop position (when the spoiler might interfere with the wing flap). Such a mechanical device may be used to drive a hydraulic valve. The mechanical system may be installed in the extension chamber of an actuator configured to actuate the spoiler across the length of its stroke. With such a mechanical feedback, it is then possible to develop various architectures to change the load limitation of the spoiler depending on its position, and therefore permits the flap to push on the spoiler with limited loads in the event of a failure of spoiler control.

Figure 1:
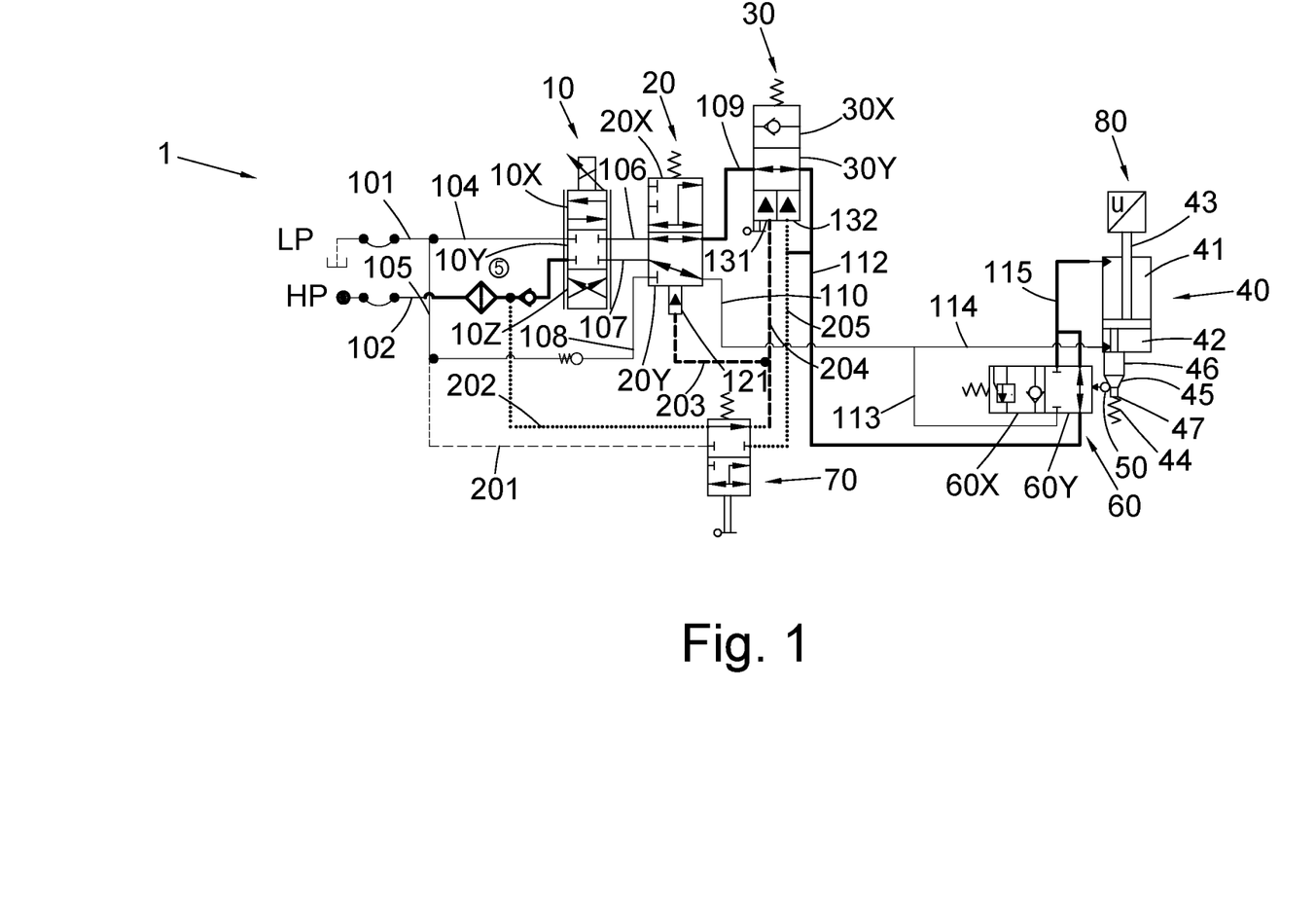
FIG. 1 is a schematic view of an actuator control valve arrangement in an active mode, when the spoiler is in a non-overlapped position.

Referring to FIG. 1, an actuator control valve arrangement 1 in a positive stroke operation, in a normal, active mode will first be described. The actuator control valve arrangement 1 comprises a three way electrohydraulic servovalve (ESHV) 10 that is fluidly connected to both a receiving, or low pressure (LP) fluid reservoir via fluid line 101 and a supply, or high pressure (HP) fluid reservoir via supply line 102. The ESVH 10 is also connected to a mode valve 20, which in turn is connected to an anti-extension valve 30.

A maintenance valve 70 is connected to and in communication with all three of the ESHV 10, the mode valve 20 and the anti-extension valve 30, as shown in FIG. 1. The anti-extension valve 30 is also connected to a spoiler actuator 40 which comprises a mechanical device 50 which is configured to detect droop stroke. The spoiler actuator 40 is connected to a pressure relief valve 60.

In operation, the actuator control valve arrangement 1 is fluidly connected to and receives fluid from the supply reservoir (i.e. the high pressure reservoir) via fluid supply line 102, and is also fluidly connected to and delivers fluid back to the receiving reservoir (i.e. containing the low pressure (LP) fluid) via line 101. The high pressure reservoir has a first pressure that is greater than the pressure in the low pressure reservoir. The spoiler actuator comprises a retraction chamber 41, at a side closest to the spoiler 80 and an extension chamber 42 provided at the opposite side, i.e. further away from the spoiler 80. A piston rod 43 is provided within the actuator which may be operatively connected to, in use, spoiler 80 and the piston rod moves within the actuator towards and away from the spoiler depending on the relative pressures of fluid in the retraction chamber 41 and the extension chamber 42. Normal operation of the actuator control valve arrangement 1 to control movement of the spoiler 1 so as to provide an extension or a droop stroke may be seen in FIG. 1.

If the spoiler is to be moved to an extension position, piston rod 43 is to be extended out of the actuator 40, HP fluid is moved into the extension chamber 42 of the actuator 40 from the supply reservoir, which causes the piston rod to extend from the actuator 40. Fluid present in the retraction chamber 41 is thus forced from the actuator 40, as the piston head moves through the actuator 40, on the other side of the piston head, to the LP fluid source. Similarly, if the spoiler is to be retracted towards a droop position, piston rod 43 is to be retracted from the extended position, the HP fluid is provided from the supply chamber to retraction chamber 41, thereby causing the piston rod 43 to retract and eject fluid from extension chamber 42 to the receiving, or LP reservoir.

As shown in FIG. 1, the direction of fluid is controlled by the EHSV valve 10 which takes up different valve positions 10X, 10Y and 10Z in response to the electric control signal (not shown). The EHSV 10 may reverse the flow of fluid between the retraction and the extension chambers 42, 41 by switching between valve positions 10X and 10Z, or the EHSV 10 may provide no flow of fluid therethrough when in position 10Y. That is, the EHSV is configured to direct fluid into and out of the retraction and extension chambers accordingly, based on whether the spoiler is to be retracted or extended.

In normal operation, when ESHV 10 is in valve position 10X to provide an extension of the spoiler, fluid is provided through fluid line 102, through position 10X of the ESHV 10, through line 107, through Mode valve 20 to fluid line 110 and 114 to extension chamber 42. Due to the increased pressure in the extension chamber 42, fluid is then forced out of the retraction chamber 41 through line 115, through the pressure relief valve 60 along line 112, through position 30Y of anti-extension valve 30, through line 109, through mode valve 20, through line 106 to line 104, and to the LP fluid source through return line 101.

When ESHV 10 is in valve position 10Z to provide a retraction of the spoiler, the flows are reversed through the ESHV 10, such that the HP fluid is provided to the retraction chamber 41. Due to the relative increase of pressure in the retraction chamber 41 compared to the extension chamber 42, the spoiler 80 is retracted.

Mode valve 20 provides first and second positions 20X and 20Y depending on which mode the actuator control valve arrangement is to operate in. When high pressure (from the HP fluid source/reservoir) is detected at port 121 of the mode valve 20 through sense lines 202 and 203 connected to the fluid supply line 102, mode valve 20 is provided in position 20Y, wherein the flow from the EHSV 10 is passed through to the remainder of the actuator control valve arrangement. When no high pressure is detected at port 121, the valve is moved to position 20X and all flow from the EHSV 10 is blocked. Rather, when the mode valve 20 is provided in position 20X, the low pressure fluid source is connected via lines 101, 105 and 108 to the remainder of the actuator control valve arrangement 1, via line 109 to the anti-extension valve 30 and line 110 to the extension chamber 42 and pressure relief valve 113.

Anti-extension valve 30 is configured to prevent the spoiler 80 from extending during electrical or hydraulic failure. In doing so, it has two positions, 30X preventing reverse flow from the retraction chamber 41 of the actuator 40, and position 30Y allowing for unimpeded flow in both directions. In selecting the position of anti-extension valve 30, anti-extension valve 30 is provided with two ports 131, 132. Port 131 senses pressure from the HP fluid source (and thereby HP fluid supply line 102) via sense line 202, and port 132 senses pressure from the retraction chamber 41 via sense line 205. If pressure is lost from the HP fluid source, then anti-extension valve 30 is moved from position 30Y to 30X. In position 30X, the anti-extension valve is provided with a pressure valve that prevents return flow from lines 112 and 115 from the retraction chamber 41. In such a case, if an external tensile load is applied to the spoiler, the pressure in the retract chamber will increase. Due to the position 30X of the anti-extension valve, the spoiler will not be able to extend until the pressure increases to a predetermined pressure, for example 1.2 times the stall force, preventing an erroneous extension of the spoiler.

As can be seen, pressure relief valve 60 has two positions, 60X and 60Y. Position 60Y allows for normal operation of the valve control arrangement, and position 60X provides pressure relief in the event of failure when the spoiler 80 is in the droop position. Pressure relief valve is operatively connected to mechanical device 50 to detect droop stroke. Mechanical device 50 is, in turn, operatively connected to actuator 40 in order to detect the position of the actuator 40, and thereby the position of the spoiler 80 and whether it is in a neutral, extended or droop position.

When the mechanical device 50 measures that the spoiler 80 is in a droop position, pressure relief valve 60 is moved from position 60Y to position 60X. Due to the position 60X, if pressure or electrical failure occurs while the spoiler is in the droop position, the pressure relief valve will limit the load that is required to be applied by the flap in order to manually move the spoiler into a non-overlapped position, such that the flap can retract.

Such an effect is achieved in position 60X by a pressure valve that prevents return flow from retraction chamber 41, through line 115 to the remainder of the control arrangement through line 112. Instead, when an increased force is provided in the retraction chamber 41, the flow through is partially provided through the pressure relief valve at a reduced pressure through line 113, which is fluidly connected to extension chamber 42 via line 114. As a result, when the spoiler is in a retracted position, the pressure in the retraction chamber 41 is reduced, thereby reducing the force that needs to be applied to the spoiler in order to achieve extension.

As would be appreciated, any kind of mechanical device 50 capable of detecting whether the spoiler is in a droop condition is envisaged. For example, a piston with a roller at its end may be used. One specific example is illustrated in the figures, and described herein by way of a non-limiting example. Spoiler actuator 40 may comprise a biasing member 44 operatively connected to piston rod 43 via a tracking portion comprising a linearly spaced first portion 47, second portion 46, and sloped portion 45 positioned there between. In this regard, the tracking portion comprises a variable diameter over its length. Mechanical device 60 is configured to contact the tracking portion.

When the spoiler 80 is in the extended portion, the mechanical device 50 may be in contact with first portion 47 of the tracking portion. As the spoiler 80 retracts, the tracking portion will move linearly with respect to the mechanical device 50 such that when the spoiler 80 is in the retracted position, the mechanical device 50 will be in contact with the second portion 46 of the actuator 40. The variance in radius between the first portion 47 and the second portion 46 will therefore result in a changed position of the mechanical device 50, which in turn will provide the pressure relief valve 60 in position 60X. As outlined above, other mechanical methods for measuring the position of the spoiler are contemplated.

Figure 2:
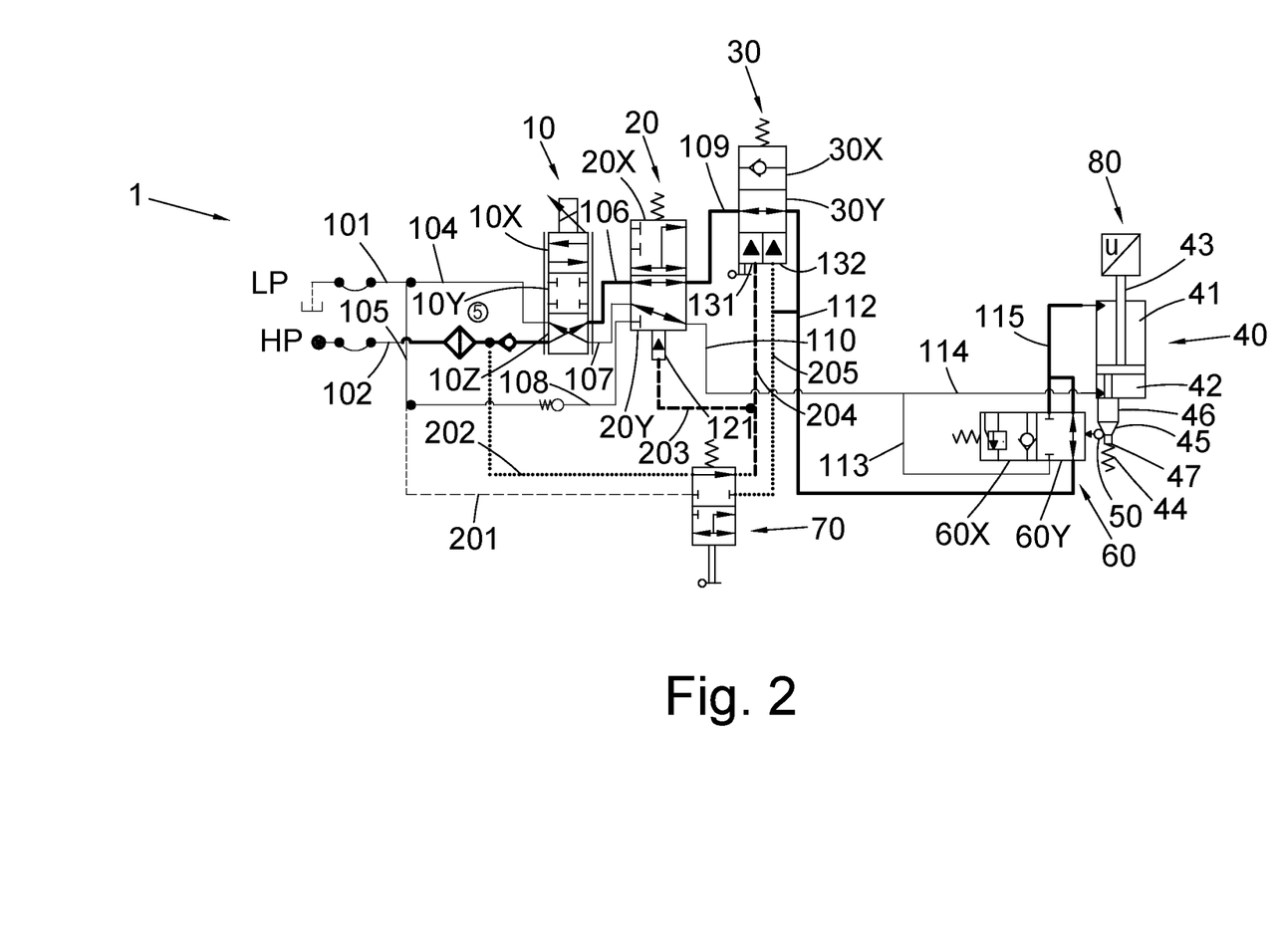
FIG. 2 is a schematic view of an actuator control valve arrangement with electrical failure, when the spoiler is in a non-overlapped position.

FIG. 2 displays the operation of the actuator control valve arrangement 1 when the spoiler 80 is in the extended position, in the case of an electrical failure. In case of electrical failure, EHSV 10 is biased to provide HP fluid to the retraction chamber 41. As a result, the spoiler 80 will retract until the spoiler is brought into contact with the flap with reduced pressure.

Figure 3:
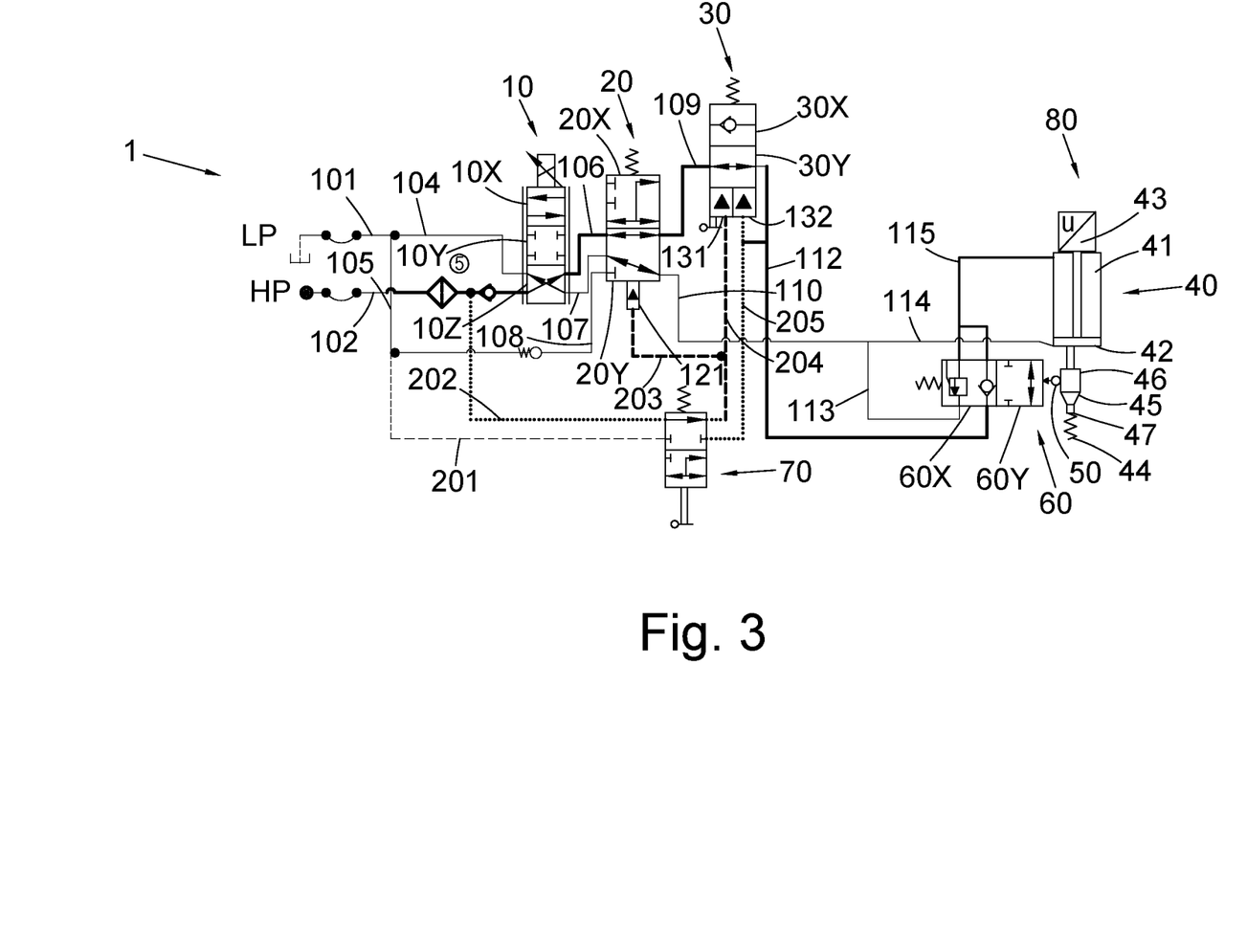
FIG. 3 is a schematic view of an actuator control valve arrangement with electrical failure, when the spoiler is in an overlapped position.

FIG. 3 displays the operation of the actuator control valve arrangement 1 when the spoiler 80 is in the droop position, in the case of an electrical failure. Again, due to the electrical failure, EHSV 10 is biased to provide HP fluid to the retraction chamber 41. However, as can be seen, when the spoiler 80 is in the droop position, as detected by the mechanical device 50 (for example, where the mechanical device is in contact with the second portion 46 of the tracking portion of the actuator 40). As a result, pressure relief valve 60 has been moved to position 60X, thereby providing reduced pressure to retraction chamber 41, as described above. Whilst this still provides retraction of the spoiler 80, it reduces the amount of retraction force on the spoiler, thereby preventing unnecessary damage to the flap. In this way, the flap may be brought into physical contact with the spoiler in order to move the spoiler into a non-overlapped position.

Figure 4:
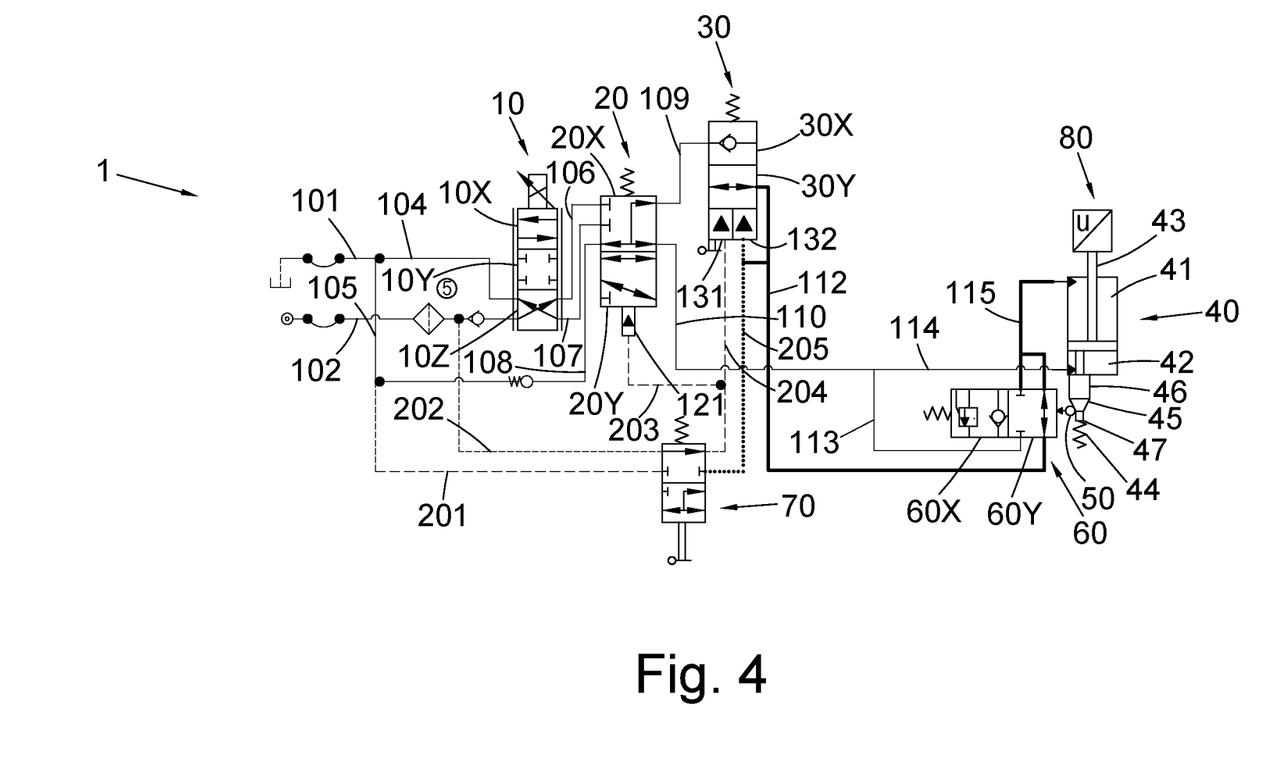
FIG. 4 is a schematic view of an actuator control valve arrangement with hydraulic failure, when the spoiler is in a non-overlapped position.

FIG. 4 displays the operation of the actuator control valve arrangement 1 when the spoiler 80 is in the extended position, in the case of a hydraulic failure. When hydraulic failure occurs, no HP fluid is provided to the actuator control valve arrangement 1. As the spoiler 80, and therefore the piston rod 43 are in the extension position, the mechanical device is positioned such that the pressure relief valve lies in position 60Y, thereby providing a fluid connection between the pressure relief valve 60 and the anti-extension valve 30. In case of such a pressure loss, anti-extension valve 30 is configured to move to position 30X, and the only high pressure fluid source is the retraction chamber 41, due to external loads on the spoiler. The retraction chamber is therefore fluidly isolated from the rest of the actuator control valve arrangement 1 by the anti-extension valve 30, and thereby the increased pressure in the retraction chamber 41 of the spoiler actuator 40 retracts the spoiler 80. Due to the position of 30X the anti-extension valve, extension of the spoiler 80 is prevented, in the presence of an extension force.

Figure 5:
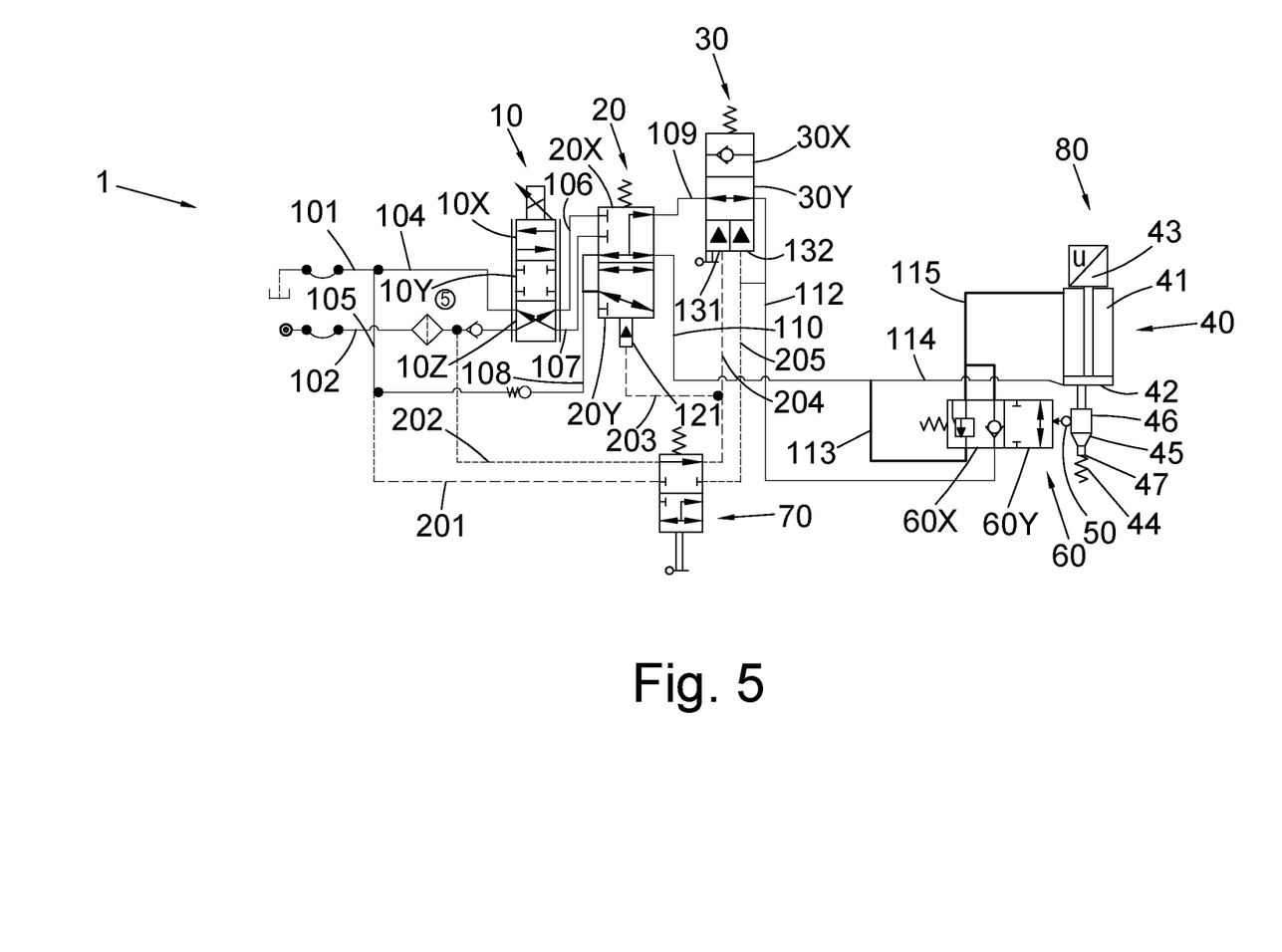
FIG. 5 is a schematic view of an actuator control valve arrangement with hydraulic failure, when the spoiler is in an overlapped position.

FIG. 5 shows the operation of the actuator control valve arrangement 1 when the spoiler 80 is in the droop position in the event of hydraulic failure, and therefore the spoiler may overlap with the flap. In this case, again, no HP fluid is provided to the actuator control valve arrangement 1, and the only high pressure source is the retraction chamber 41. However, as the spoiler 80 is in the droop position, pressure relief valve 60 is provided in position 60X, which relieves pressure from the retraction chamber to the rest of the valve arrangement, including extension chamber 42 until the spoiler reaches a neutral position. As a result, less force from the flap is required to move the spoiler 80, reducing the likelihood of damage to either the spoiler 80 or the flap.

The examples described herein therefore provide an actuator control valve arrangement that can provide a spoiler in a droop position, yet may be operated to retract a spoiler in the event of failure. Equally, if failure occurs with the spoiler is in a droop position, the examples described herein provide a simple, reliable mechanical feature to detect the presence of a droop condition and provide pressure relief from the actuator that retracts the spoiler into the droop position. In this way, it is possible to prevent damage when the spoiler is in a position such that it overlaps the movement range of the flap.

The invention claimed is:

1. A system for detecting and controlling the position of a spoiler of an aircraft wing comprising:
    a hydraulic actuator having a piston rod operably connected to the spoiler, the piston rod being moveable between a retracted position, a neutral position and an extended position; and
    means for providing power to said hydraulic actuator; and
    a mechanical device operatively connected to the hydraulic actuator to detect whether the piston rod is in the retracted position, the neutral position or the extended position; and
    means, operatively connected to the mechanical device, that is configured to provide a change in a load applied to said hydraulic actuator
    based on whether said piston rod is detected by the mechanical device as being in said retracted position or said extended position.

2. The system of claim 1, wherein said means configured to change said load based on the position of said piston rod comprises a pressure relief valve.

3. The system of claim 2, wherein said pressure relief valve is configured to switch from a first position to a second position upon detection that said piston rod is in the retracted position.

4. The system of claim 3, wherein, when said rod is in said retracted position and said pressure relief valve is in said second position, upon loss of said power, said pressure relief valve limits said load applied to said piston rod.

5. The system of claim 1, further comprising an anti-extension valve operably connected to said hydraulic actuator and configured to prevent the piston rod from moving into the extended position upon loss of said power.

6. The system of claim 5, wherein the hydraulic actuator comprises a retraction chamber and an extension chamber, and wherein:
    if the hydraulic pressure in the retraction chamber is greater than the pressure in the extension chamber, the piston rod will move into the retracted position; and
    if the pressure in the extension chamber is greater than the pressure in the retraction chamber, the piston rod will move into the extended position; and
    wherein said anti-extension valve is movable from a first position to a second position upon loss of said power, and wherein, in said second position said piston rod is prevented from moving to said extended position unless a threshold pressure is reached in said extension chamber.

7. The system of claim 6, wherein said threshold pressure is 1.2 times a force.

8. The system of claim 1, wherein said power comprises electrical power.

9. The system of claim 1, wherein said power comprises hydraulic power.

* * * * *